(12) United States Patent
Lee

(10) Patent No.: US 6,332,333 B1
(45) Date of Patent: Dec. 25, 2001

(54) ICE-CREAM FREEZER

(76) Inventor: Ming-Tsung Lee, 3F., No. 51, Chong-Te 11th St., Tainan (TW)

( * ) Notice: Subject to any disclaimer, the term of this patent is extended or adjusted under 35 U.S.C. 154(b) by 0 days.

(21) Appl. No.: 09/732,300

(22) Filed: Dec. 8, 2000

(51) Int. Cl.[7] ............................................ A23G 9/12
(52) U.S. Cl. ............................................ 62/342; 366/310
(58) Field of Search .................. 62/342, 343; 366/98, 366/222, 223, 310, 320

(56) References Cited

U.S. PATENT DOCUMENTS

| | | | |
|---|---|---|---|
| 2,996,022 | * 8/1961 | MacCashen | 366/98 |
| 4,070,957 | * 1/1978 | Korekawa et al. | 62/342 |
| 4,736,600 | * 4/1988 | Brown | 62/342 |
| 4,796,440 | * 1/1989 | Shiotani et al. | 62/343 |
| 4,910,073 | * 3/1990 | Osrow et al. | 366/320 |
| 4,920,761 | * 5/1990 | Bukoschek et al. | 62/342 |
| 5,549,042 | * 8/1996 | Bukoschek et al. | 62/342 |
| 6,250,794 | * 6/2001 | Huang | 62/342 |

* cited by examiner

*Primary Examiner*—William E. Tapolcai

(57) ABSTRACT

An ice-cream freezer includes a base, a bucket, a freezing cylinder, a stirring unit, a fixing annular cover, a cap and a transmitting device. The transmitting device consists of a motor, a transmitting gear, a transmitting shaft, and a transmitting rod. The motor is positioned under the base, rotating the transmitting gear, then the transmitting shaft and then the transmitting rod that then rotates a large gear of the stirring unit, and then two stirring arm to stir ingredients of ice cream placed in the bucket and at the same time frozen by the freezing cylinder placed inside the bucket. The components of the ice-cream freezer are convenient to assemble and disassemble for washing and cleaning, with the motor never getting wet to prolong service life of the ice-cream freezer.

5 Claims, 3 Drawing Sheets

ICE-CREAM FREEZER

BACKGROUND OF THE INVENTION

1. Field of the Invention

This invention relates to a ice-cream freezer, particularly to one having a transmission device provided under a base so as to keep a motor from getting wet, thus increasing service life of the ice-cream freezer, with its components easy to assemble and disassemble for cleaning and convenient to use.

2. Description of the Prior Art

As industry and commerce have been developing year and year, living quality has also been enhanced gradually, and large sized electric appliances have been made smaller and smaller for convenience to be used in homes. An ice-cream freezer is one among them, possible to be made at home with required ingredient available on market, without need or trouble of going out to buy it, especially troublesome in hot summer. A common disadvantage of conventional ice-cream freezers available on market is that a stirring means is directly connected to a motor device for rotating the stirring means to stir ice-cream ingredient. But the motor device has to be used for a long period of time or frequently taken off for washing to cause the connect point of the stirring means and the motor to let water flowing in the motor to form short-circuit and damage.

SUMMARY OF THE INVENTION

The objective of the invention is to offer an ice-cream freezer having a stirring means and a bucket easy for cleaning without wetting a motor, prolonging its service life.

The main feature of the invention is a transmitting device having a motor positioned under a base combined under a bucket having an annular vertical space in an outer wall filled with heat-insulating material, a freezing cylinder having a freezing agent filled in its outer circumferential wall and positioned in the bucket to freeze ingredients of ice cream and stirred by at the same time by two stirring helical arms rotated by a large gear rotated by the transmitting device consisting of the motor, a transmitting gear, a transmitting shaft and a transmitting rod.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
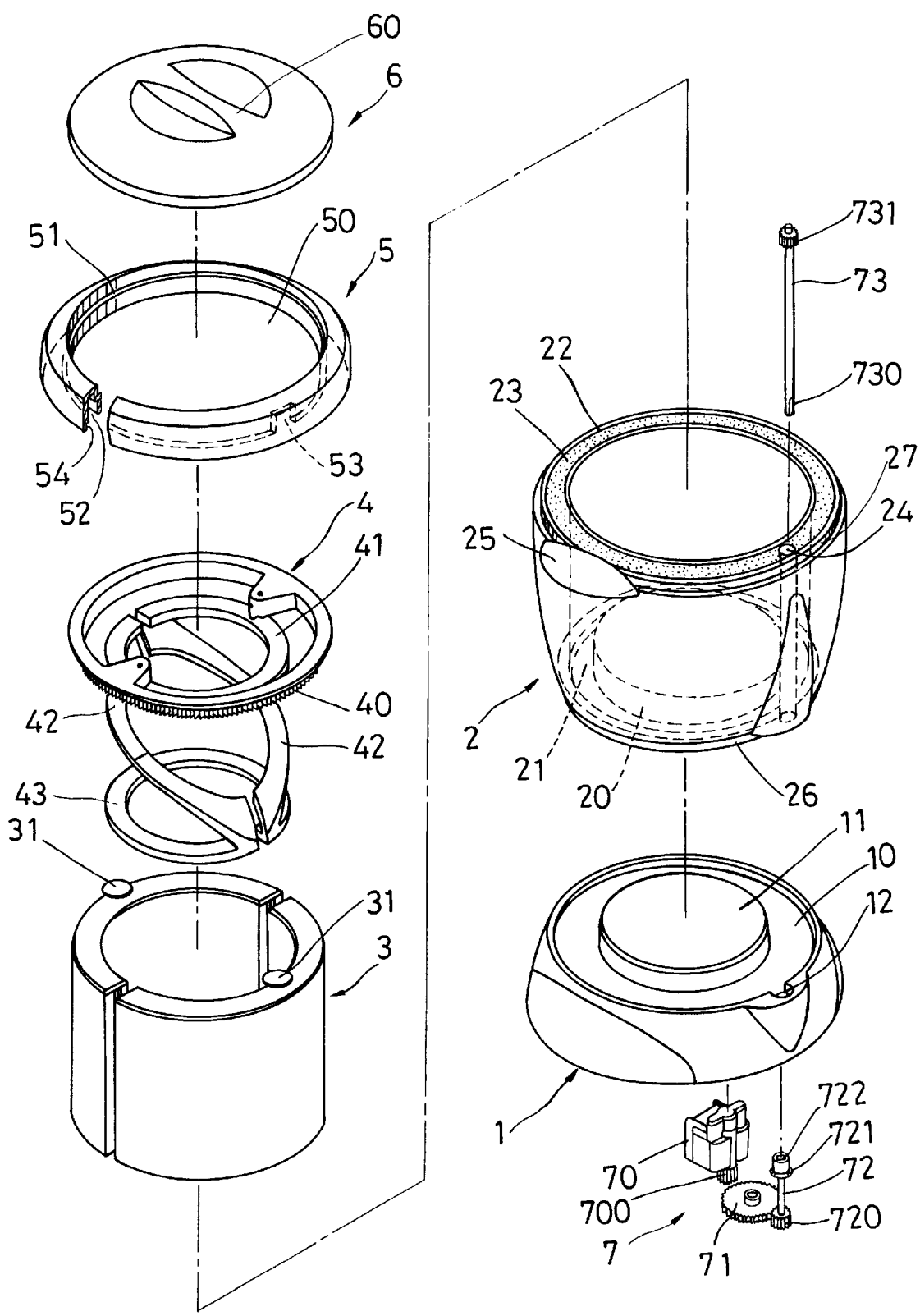
FIG. 1 is an exploded perspective view of an ice-cream freezer in the present invention.
Figure 2:
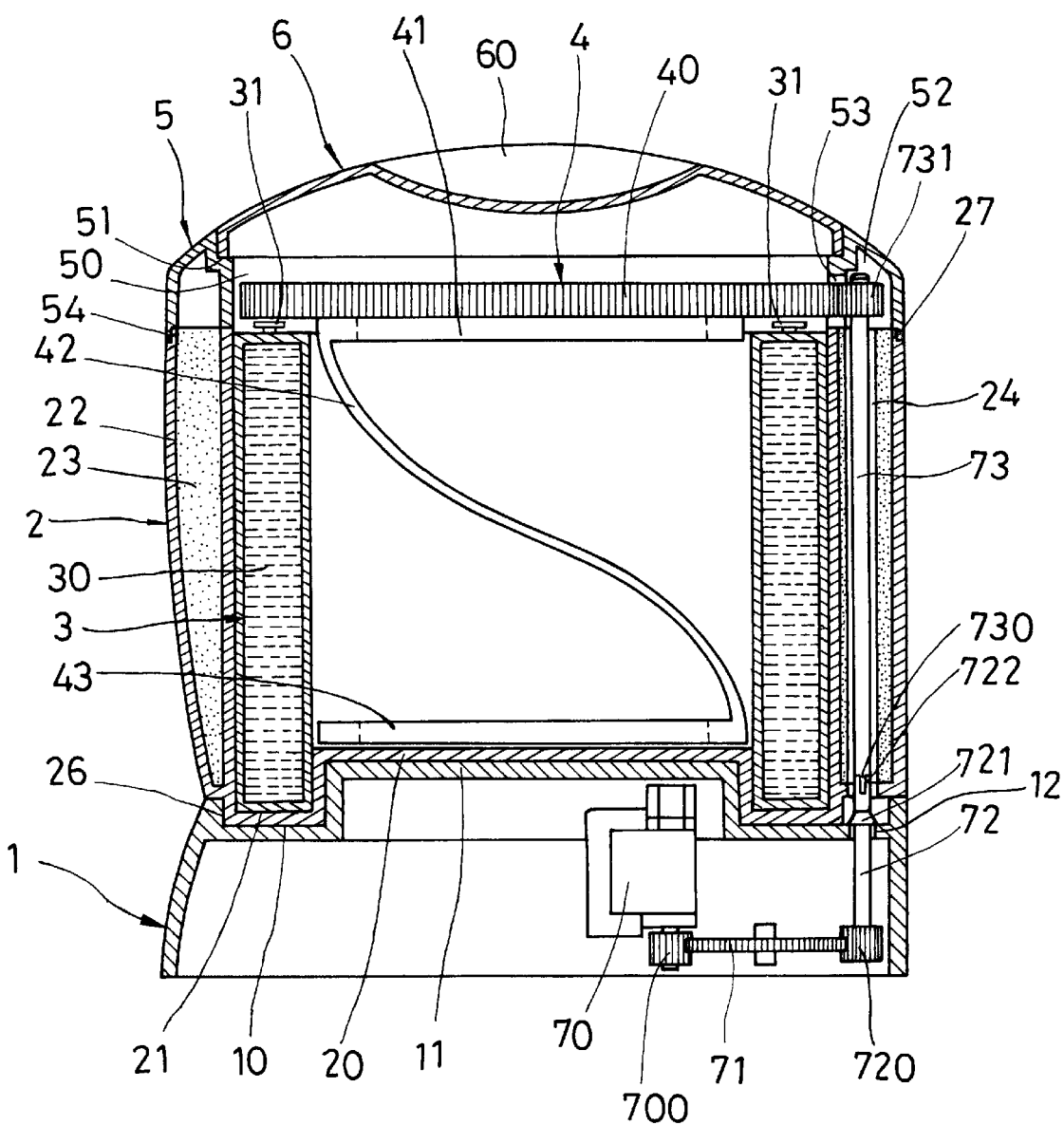
FIG. 2 is a cross-sectional view of the ice-cream freezer in the present invention; and, FIG. 3 is a perspective view of the ice-cream freezer in the present invention.

A preferred embodiment of an ice-cream freezer in the present invention, as shown in FIGS. 1 and 2, includes a base 1, a bucket 2, a freezing cylinder 3, a stirring unit 4, a fixing annular cover 5, a cap 6 and a transmitting device 7 as main components combined together.

The base 1 has an annular recess 10 formed on an upper surface, a center circular projection 11 formed inside the annular recess 10, and an upright through hole 12 formed in an outer edge of the annular recess 10.

The bucket 2 is positioned on the base 1, having a circular recess 20 formed in the center portion of the bottom, an annular groove 21 defining the circular recess 20, an annular vertical space 22 formed between an inner annular wall and an outer annular wall, heat-insulating material 23 (such as Styrofoam) filled in the annular vertical space 22, and a vertical through hole 24 formed in an outer annular wall, two grips 25 formed on an outer upper surface of the outer annular wall, an annular fitting edge 26 formed in the bottom, and an annular fitting edge 27 also formed in an upper side.

The freezing cylinder 3 is positioned in the bucket 2, consisting of two semi-circular members combined together, having a freezing agent 30 such as salt (NaCl) water filled in the two semi-circular members and two opposite ears 31 provided on an upper edge of the freezing cylinder 3.

The stirring unit 4 is located in the bucket 2, having a large gear 40 in an upper portion, a first position frame 41 provided under the large gear 40, two helical stirring arms 42 fixed oppositely under the first position frame 41, and a second position frame 43 provided under the stirring arms 42.

The fixing annular cover 5 closes on an upper side of the bucket 2, having a center opening 50, an annular inner projecting edge 51 formed around an inner wall of the center opening 50, an annular hollow 52 formed in the bottom, a notch 53 formed in the wall defining the center opening 50, and a lower annular fitting edge 54 formed on the bottom edge.

The cap 6 closes on the center opening 50 of the fixing annular cover 5, having a lift ear 60 formed on an upper surface.

The transmitting device 7 is positioned on the bottom of the base 1 and in the bucket 2, consisting of a motor 70, a transmitting gear 71, a transmitting shaft 72, and a transmitting rod 73. The motor 70 is positioned under the base 1, having a gear 700 provided under the motor 70, and the transmitting shaft 72 has a pinion 720 fixed with a lower end, a flange 721 provided near an upper end, and an insert hole 722 formed in an upper end. The elongate transmitting rod 73 has an insert means 730 formed in a lower end and a pinion 731 fixed on an upper end.

Figure 3:
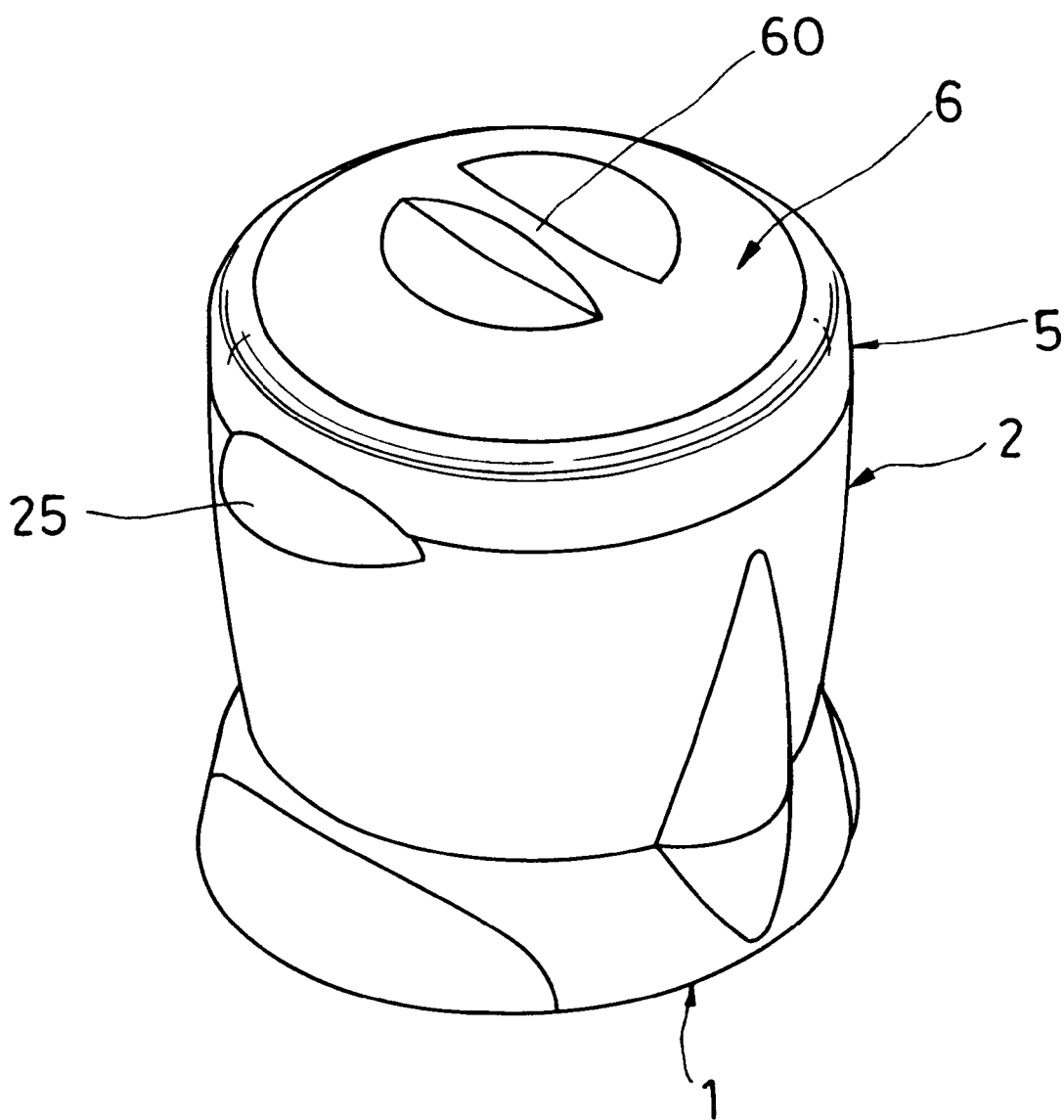

In assembling, referring to FIGS. 1, 2 and 3, firstly, the motor 70, the transmitting gear 71 and the transmitting shaft 72 are deposited under the base 1, letting the transmitting gear 71 engage the gear 700 of the motor 70, and with the transmitting gear 71 having the other side engaging the pinion 720 of the lower end of the transmitting shaft 72. Then the upper end of the transmitting shaft 72 extends through the through hole 12 of the base 1, and then the bucket 2 is assembled on the base 1, with the fitting edge 26 of the bucket 2 fits with the base 1 in a stabilized condition. Next, the upper end of the transmitting shaft 72 inserts in the through hole 24 of the bucket 2, and the insert means 730 of the transmitting rod 73 fits in the insert hole 722 of the transmitting shaft 72 stably, with the pinion 731 extending out of the through hole 24. After that, the freezing cylinder 3 is placed in the bucket 2, with the bottom of the freezing cylinder 3 fitting in the annular groove 21 of the bucket 2. Then the stirring unit 4 is deposited in the bucket 2, and in the freezing cylinder 3, with the large gear 40 engaging the pinion 731 of the transmitting rod 73. Further, the fixing annular cover 5 is placed on the annular upper side of the bucket 2, and the pinion 731 of the transmitting rod 73 engages the large gear 40 in the notch 53 of the fixing annular cover 5, permitting the pinion 731 engage and rotate with the large gear 40. Lastly the cap 6 is closed on the center opening 50 of the fixing annular cover 5, finishing assembly of the ice-cream freezer.

In using, the freezing cylinder 3 is in advance placed in the freezing room of a refrigerator to let the freezing agent (for example, salt (NaCl) water) in the cylinder 3 freeze to under $-10°$ C. to become hard. Then the freezing cylinder 3 is taken out of the refrigerator and placed in the bucket 2, and then the stirring unit 4 is also placed in the bucket 2, with the heat-insulating material 23 preventing outer temperature from transmitting into the bucket 2, maintaining freezing temperature of the freezing cylinder 3. Next the fixing annular cover 5 is closed on the bucket 2, and the ingredient of ice-cream are poured into the bucket 2, with the motor 70 turned on to let the gear 700 and the transmitting gear 71 rotate. Then the pinion 720 of the transmitting shaft 72 rotates, subsequently rotating the transmitting rod 73 and the pinion 731, which then rotates the large gear 40 of the stirring unit 4. Then the two stirring arms 42 also are rotated to stir the ingredient of ice-cream in the bucket 2 to be gradually frozen by the low temperature of the freezing cylinder 3, with the ingredient of ice-cream becoming ice-cream, very convenient to make ice-cream.

After using the ice-cream freezer in the invention and if the stirring unit 4 and the bucket 2 are wanted to be washed and cleaned, only take off the fixing annular cover 5 off the bucket 2, and then the stirring unit 4 can be easily taken out of the bucket 2, subsequently with the freezing cylinder 3 and the bucket 2 easily taken out after disassembled from the base 1. Then the components can be washed and cleaned separately, and thus the ice-cream freezer in the invention is easy to assemble and to disassemble. In addition, the base 1 does not tough the ingredients of ice cream, needing no washing or cleaning. Further, the electric circuit of the motor 70 is provided under the base 1, never contacting with water or get wet to become short-circuited, keeping safe the ice-cream freezer to prolong its service life. And it is worth to notice that the two stirring arms 41 are positioned oppositely and shaped helical so as to stir the ingredients in balanced condition to get delicious ice cream.

While the preferred embodiment of the invention has been described above, it will be recognized and understood that various modifications may be made therein and the appended claims are intended to cover all such modifications that may fall within the spirit and scope of the invention.

What is claimed is:

1. An ice-cream freezer comprising:
   a base having an annular recess formed in an upper surface, a center circular projection formed inside said annular recess, and a vertical hole formed in an annular outer wall;

a bucket combined on said base, having a center circular recess formed in a bottom, an annular groove defining said center circular recess, an annular vertical space defined by an inner annular wall and an outer annular wall for filling heat-insulating material therein, and a vertical through hole formed in said outer annular wall;

a freezing cylinder positioned in said bucket, having freezing agent filled in a hollow interior of its annular wall;

a stirring unit provided in said bucket, consisting of a large gear provided in an upper portion, a first fixing annular frame provided under said large gear, two helical stirring arms provided oppositely under said first fixing annular frame, and a second fixing annular frame provided under said two stirring arms;

a fixing annular cover closed on an upper edge of said bucket, having a center opening;

a cap closing on said center opening of said fixing annular cover;

a transmitting device combined with a bottom of said base, consisting of a motor, a transmitting gear, a transmitting shaft, and a transmitting rod combined together;

said motor rotating said transmitting gear and then said transmitting shaft, said transmitting shaft then rotating said transmitting rod, said transmitting rod then rotating said large gear of said stirring unit and subsequently said two stirring arms to stir ingredients of ice-cream placed in said freezing cylinder in said bucket in a balanced condition, said ingredients both stirred and gradually frozen by said freezing cylinder to become ice-cream; every components of said ice-cream freezer convenient to assemble and disassemble for washing and cleaning, with said motor needing no washing owing to its location under said base and not getting wet to prolong the service life of said ice-cream freezer.

2. The ice-cream freezer as claimed in claim 1, wherein said heat-insulating material filled in said annular vertical space of said bucket is Styrofoam.

3. The ice-cream freezer as claimed in claim 1, wherein said freezing agent in said freezing cylinder is salt (NaCl) water.

4. The ice-cream freezer as claimed in claim 1, wherein said freezing cylinder consists of two semi-circular members combined together, having two opposite ears on an upper edge.

5. The ice-cream freezer as claimed in claim 1, wherein a gear is provided under said motor, a gear is also provided at a lower end of said transmitting shaft, said gear under said motor and said pinion of said transmitting shaft indirectly engage by means of said transmitting gear engaging both said gear and said pinion, a flange is provided near said upper end of said transmitting shaft, an insert hole is provided in an upper end of said transmitting shaft for an insert means formed in a lower end of said transmitting rod to insert, and a pinion is provided at an upper end of said transmitting rod to engage said large gear of said stirring unit.

* * * * *